United States Patent Office 2,766,231
Patented Oct. 9, 1956

2,766,231

MONOAZO-DYESTUFFS

Hans Bolliger, Basel, Switzerland, assignor to Ciba Limited, Basel, Switzerland, a Swiss firm No Drawing. Application January 25, 1954,
Serial No. 406,086

Claims priority, application Switzerland January 28, 1953

9 Claims. (Cl. 260—163)

This invention provides valuable new monoazodyestuffs which contain at least one acylated sulfonic acid amide group and at least one group of the formula (1) 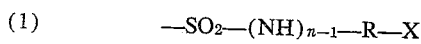

in which R represents an aliphatic radical, n represents a whole number not greater than 2, and X represents a halogen atom.

The halogen atom may be present in the γ-position, but is advantageously present in the β-position, of the aliphatic radical R which is bound in the α-position to the —SO₂— group through the —NH— group (n=2) or directly (n=1). The aliphatic radical R may contain further substituents such, for example, as a hydroxyl group. Especially valuable are those dyestuffs of the invention which contain as a group of the Formula 1 a γ-chlor-, but advantageously a β-chlor-, alkyl sulfonic acid amide group, for example a β-chlorethyl sulfonic acid amide group.

In addition to a group of the latter kind the dyestuffs of the invention must contain at least one acylated sulfonic acid amide group, advantageously a group of the formula (2) —SO₂—NH=acyl in which the acyl radical may be the radical of a very wide variety of acids, for example, aliphatic or aromatic carboxylic acids, but more especially aliphatic or aromatic sulfonic acids. Thus, for example, the acyl radical may be an acetyl, n-butyryl, benzoyl, para-tertiary-butylbenzoyl or para-chlorobenzoyl radical, but more especially a sulfonyl radical, for example, the methane-sulfonyl, ethane - sulfonyl, n - butane - sulfonyl, benzene - sulfonyl, para-methyl-benzene-sulfonyl, ortho- or para-chlorobenzene, sulfonyl or dichlorobenzene sulfonyl radical.

The acylated sulfonic acid amide group and the group of the Formula 1 may be present in any desired positions in the dyestuff molecule, that is to say, one group of these two kinds may be present in the radical of a single component or one dyestuff component may contain, for example, the acylated sulfonic acid amide group and the other component the group of the Formula 1. Especially valuable are monoazo-dyestuffs of this kind which contain the group of the Formula 1 in the radical of the diazo component and the acylated sulfonic acid amide group in the radical of the coupling component.

The dyestuffs of the invention are advantageously prepared from dyestuff components which already contain the aforesaid groups. The dyestuff components used may of course contain further substituents, such, for example, as halogen atoms, nitro groups, acylamino, alkyl or alkoxy groups. However, it is of advantage to use diazo compounds which contain no hydroxyl group in ortho-position to the diazo group.

The dyestuff components which contain an acylated sulfonic acid amide group can be made by methods in themselves known by acylating the corresponding unsubstituted sulfonic acid amide with any desired acid halide, for example, with an aliphatic or aromatic carboxylic acid chloride or advantageously with an aliphatic or aromatic sulfonic acid chloride. If necessary, any hydroxyl or amino group present in the product to be acylated may be protected or need not be present as such, but in the form of a substituent convertible into such a group after the acylation. It is also possible in certain cases to use the corresponding sulfonic acids, instead of the corresponding non-acylated sulfonic acid amides, in which case, after protecting any sensitive groups, for example, by acylation, the sulfonic acid group is converted in known manner into a sulfonic acid chloride group, the resulting sulfochloride is reacted with an aliphatic or aromatic amide to form the acylated sulfonic acid amide, and the protected groups are then re-formed.

As examples of suitable starting materials there may be mentioned:

A. Components containing an acylated sulfonic acid amide group, such as: Diazo compounds of 1-aminobenzene-3- or -4-sulfonic acid N-acetylamide, 4-methyl- or 4-methoxy-1-aminobenzene-3-sulfonic acid N-benzoylamide, 1 - aminobenzene - 2 - sulfonic acid N - (methane sulfonyl) - amide, 1 - aminobenzene - 2 - or - 3 - or 4 - sulfonic acid N - (para - toluene - sulfonyl) - amide, 2 - chloro - 1 - aminobenzene - 5 - sulfonic acid N - benzene sulfonyl amide, 4 - methyl - 1 - aminobenzene - 2-sulfonic acid N - benzene sulfonylamide, 1 - amino - 2-methylbenzene - 5 - sulfonic acid N - benzene sulfonyl amide or 1 - amino - 2:6 - dichlorobenzene - 4 - sulfonic acid N - benzene sulfonylamide, and coupling components such as 1 - hydroxynaphthalene - 4 - or - 5 - sulfonic acid N - acetylamide, 1 - hydroxynaphthalene - 4 - or - 5 - sulfonic acid N - benzenesulfonylamide 2 - hydroxynaphthalene - 3 -, - 4 -, - 5 -, - 6 -, - 7 - or - 8 - sulfonic acid - N - benzoylamide, 8 - hydroxyquinoline - 5-sulfonic acid N - para - toluene sulfonylamide, 2 - aminonaphthalene - 6 - sulfonic acid - N - benzene sulfonyl amide, 2 - amino - 8 - hydroxynaphthalene - 6 - sulfonic acid N-(para-toluene sulfonyl)-amide, 2-amino-8-hydroxynaphthalene-6-sulfonic acid N-benzene sulfonylamide, 2-amino-8-hydroxynaphthalene-6-sulfonic acid-N - (2':5' - dichlorobenzoyl) - amide, 1 - (α - naphthyl) - 3 - methyl - 5 - pyrazolone - 4' - sulfonic acid-N - acetylamide, 1 - phenyl - 3 - methyl - 5 - pyrazolone-2'-, -3'- or -4'-sulfonic acid N-(para-toluene sulfonyl)-amide, 1 - phenyl - 3 - methyl - 5 - pyrazolone - 2' -, - 3'- or -4'-sulfonic acid N-(2":5"-dichlorobenzene sulfonyl)-amide, 1 - phenyl - 3 - methyl - 5 - pyrazolone - 2' -, - 3'- or -4'-sulfonic acid-N-benzene sulfonylamide, 1-phenyl-3 - methyl - 5 - pyrazolone - 2' -, - 3' - or - 4' - sulfonic acid - N - (para - chlorobenzenesulfonyl) - amide, 1-phenyl - 3 - methyl - 5 - pyrazolone - 2' - chloro - 5'-sulfonic acid - N - benzene sulfonyl - amide, 1 - phenyl-3 - methyl - 5 - pyrazolone - 2':6' - dichloro - 4' - sulfonic acid - N - benzene sulfonyl - amide, 1 - acetoacetyl-amino benzene - 2 -, - 3 - or - 4 - sulfonic acid - N - benzoylamide, 1-acetoacetylaminobenzene-2-, -3- or -4-sulfonic acid-N-benzene sulfonylamide.

The aforesaid pyrazolone coupling components may be prepared from arylamines containing an acylated sulfonic acid amide group by diazotizing such an amine, reducing the resulting diazo-compounds to a hydrazine, for example, by means of an alkali bisulfite or stannous chloride, and condensing the hydrazine so obtained with an acylacetic acid amide or with an acyl acetic acid ester, especially acetoacetic acid methyl or ethyl ester, the formation of the pyrazolone being completed without hydrolysis of the acylated sulfonic acid amide group.

B. Components which contain a group of the above Formula 1, such as the diazo-compounds of the following amines: 1-aminobenzene-4-sulfonic acid-β-chloroethyl-amide, 1-aminobenzene-3:5-di-(sulfonic acid-β-chloroethylamide), 1-aminobenzene-4-sulfonic acid-(γ-chloro-β-hydroxypropyl)-amide, 1-aminobenzene-4-sulfonic acid-γ-chloropropylamide, 4-methyl-1-aminobenzene-3-sulfonic acid-β-bromethylamide, 4-methyl-1-aminobenzene-3-sulfonic acid-β-chloroethylamide, 2:5-dichloro-1-aminobenzene-4-sulfonic acid-β-chloroethylamide, 2-methoxy-1-aminobenzene-5β-chloroethylsulfone, 1-aminobenzene-2-, -3- or -4-β-chlorethylsulfone or 2:6-dichloro-1-aminobenzene-4-sulfonic acid-β-chloroethylamide, and the following coupling components: 2-aminonaphthalene-6- sulfonic acid-β-chlorethylamide, 1-hydroxynaphthalene-4- or 5-sulfonic acid-β-chlorethylamide, 2-hydroxynaphthalene-6-sulfonic acid-β-chlorethylamide, 2-hydroxynaphthalene-6-β-chlorethylsulfone, 1-phenyl-3-methyl-5-pyrazolone-2'-, -3'- or -4'-sulfonic acid-β-chlorethylamide, 1-phenyl-3-methyl - 5 - pyrazolone - 3' - sulfonic acid - γ - chloropropylamide, 1-phenyl - 3-methyl - 5-pyrazolone - 3'-β-chlorethylsulfone.

The monoazo-dyestuffs obtainable from the aforesaid components are new and can be made by coupling a diazo compound mentioned under A with a coupling component mentioned under B or advantageously by coupling a diazo compound mentioned under B with a coupling component mentioned under A in a not strongly alkaline, and advantageously a neutral to acid, medium.

The resulting azo dyestuffs contain at least one acylated sulfonic acid amide group and at least one group of the formula (1)    $-SO_2-(NH)_{n-1}-R-X$ in which R represents an aliphatic radical, $n$ represents a whole number not greater than 2 and X represents a halogen atom advantageously a chlorine atom. The dyestuffs of this constitution which contain a group of the Formula 1 in which $n$ is the whole number 2, can be made by a method other than by coupling, namely, by introducing the two groups, that is to say the group of the Formula 1 in which $n$ is the whole number 2, and the acylated sulfonic acid amide group into a finished dyestuff free from these groups by methods in themselves known which can be used mutatis mutandis for introducing these groups into the dyestuff components mentioned above. For this purpose, for example, in accordance with the process of application Serial No. 343,501, filed 19th March, 1953, by Schmid et al., a dyestuff which contains two sulfonic acid groups may be converted into the corresponding disulfochloride, and the latter is then asymmetrically amidated, that is to say, amidated in such manner that one of the sulfochloride groups is converted, for example, by reaction with an acylamide into an acylated sulfonic acid amide group, and the other sulfochloride group is converted, for example, by reaction with a primary alkylamine containing a β- or γ-halogen atom into a group of the Formula 1.

Especially valuable among the new dyestuffs of the invention are monoazo-dyestuffs of the formula

(3)

in which R represents the radical of a diazo component of the naphthalene or advantageously the benzene series, B represents an aliphatic radical which contains in the β- or γ-position a halogen atom, advantageously a chlorine atom, $n$ represents a whole number not greater than 2, and Pz represents a 5-pyrazolone radical which contains in the 3-position or advantageously in the 1-position an aryl radical substituted by an acylated sulfonic acid amide group. Advantageously such monoazo dyestuffs are free from sulfonic acid and carboxylic acid groups.

The dyestuffs of the invention can be used for dyeing or printing various materials, especially nitrogenous natural or artificial fibers such as leather, silk or wool, and also structures of superpolyamides or superpolyurethanes. They are suitable for dyeing from weakly acid to neutral baths. Dyeings so produced are level and are distinguished by their good fastness to light and remarkable fastness to washing and fulling.

As compared with the comparable dyestuffs hitherto known, which contain an acylated sulfonic acid amide group, the dyestuffs of this invention have the advantage of yielding dyeings of much better fastness to washing, and as compared with the comparable known dyestuffs which contain a β-halogen-alkyl amide group the dyestuffs of this invention are distinguished by their enhanced affinity when applied from neutral baths, and also by their improved fastness to washing.

The following examples illustrate the invention, the parts and percentages being by weight unless otherwise stated, and the relationship of parts by weight to parts by volume being the same as that of the kilogram to the liter:

*Example 1*

24.9 parts of 4-methyl-1-aminobenzene-3-sulfonic acid N-β-chlorethylamide are dissolved in 75 parts by volume of water, 25 parts by volume of hydrochloric acid (density=1.18) are added, and diazotization is brought about with 6.9 parts of sodium nitrite. The solution is introduced, while stirring, in the course of 15 minutes into an ice-cold mixture of 40 parts of 1-phenyl-3-methyl-5-pyrazolone-3'-sulfonic acid N-benzene sulfonylamide, 5.3 parts of anhydrous sodium carbonate, 30 parts of crystalline sodium acetate and 150 parts by volume of water. After several hours the precipitated dyestuff is isolated in the usual manner and dried. The new dyestuff is a red-yellow powder which dissolves in water with a yellow coloration and dyes wool from a neutral bath pure yellow tints, which are distinguished above all by their remarkable properties of wet fastness and also by their high fastness to light.

The pyrazolone used in this example may be prepared as follows:

31.2 parts of 3-aminobenzene-1-sulfonic acid N-benzene-sulfonylamide are dissolved in 125 parts by volume of water with the addition of 5.3 parts of anhydrous sodium carbonate. After the addition of 6.9 parts of sodium nitrite, the mixture is introduced, while stirring strongly, into a mixture of 100 parts of ice and 10 parts by volume of sulfuric acid (density=1.8). After 20 minutes the precipitated diazonium compound is rapidly filtered off, and introduced into an ice-cold mixture of 45 parts by volume of sodium bisulfite solution (containing per liter 550 grams of $NaHSO_3$), 22 parts by volume of a sodium hydroxide solution of 30 percent strength and 30 parts by volume of water. The whole is stirred for one hour at 0–5° C. and for 2 hours at 20° C., then heated to the boil, and 70 parts by volume of hydrochloric acid (density=1.18) are introduced dropwise in the course of ½ hour. After being maintained for a further 20 minutes at 95° C., the whole is cooled to 20° C. and filtered. The crystalline precipitate is dissolved in 150 parts by volume of water with the addition of 5.3 parts of anhydrous sodium carbonate. After introducing dropwise 13 parts by volume of ethyl acetoacetate, the whole is heated at the boil for one hour. At the end of this period 18 parts by volume of hydrochloric acid (density=1.18) are introduced dropwise, and the mixture is allowed to cool while stirring.

The 1-phenyl-3-methyl-5-pyrazolone-4'-sulfonic acid N-ethane sulfonylamide used in this example can be obtained from 1-aminobenzene-4-sulfonic acid N-ethane sulfonylamide by the method described in the last paragraph of Example 1.

*Example 3*

22 parts of 4-aminobenzene-β-chlorethylsulfone are diazotized according to the method described in Example 2. The obtained diazo solution is coupled with a solution of 40 parts of 1-phenyl-3-methyl-5-pyrazolone-3'-sulfonic acid N-benzene sulfonylamide, 5.3 parts of sodium carbonate and 20 parts of potassium acetate in 200 parts of water. When the coupling is finished the resulting dyestuff of the formula

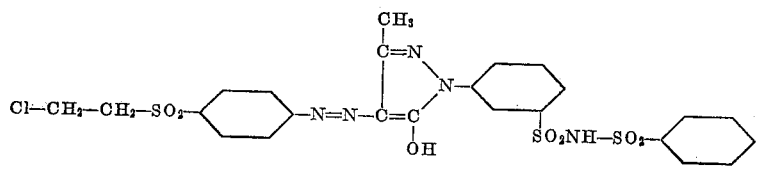

By filtering the mixture and drying the filter residue there is obtained 1-phenyl-3-methyl-5-pyrazolone-3'-sulfonic acid N-benzene sulfonylamide of the formula

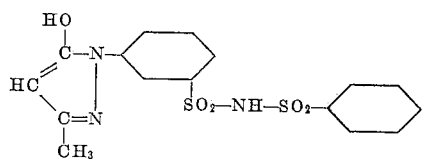

which can be purified by recrystallization from a large quantity of water.

*Example 2*

24.9 parts of 4-methyl-1-aminobenzene-3-sulfonic acid N-β-chlorethylamide are dissolved in 100 parts of water with the addition of 26 parts of hydrochloric acid (density=1.18), and diazotized in the usual manner with a concentrated aqueous solution of 6.9 parts of sodium nitrite. The clear diazo-solution is introduced into a solution of 36 parts of 1-phenyl-3-methyl-5-pyrazolone-4'-sulfonic acid N-ethane sulfonylamide, 5.3 parts of sodium carbonate and 20 parts of crystalline sodium acetate in 200 parts of water. When the coupling is finished the whole is heated to 80° C., salted out, filtered, and the filter residue is dried. There is obtained the dyestuff of the formula

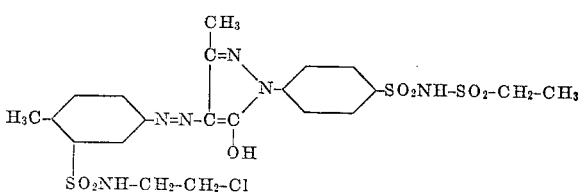

The new dyestuff is a red-yellow powder which dissolves in water with a yellow coloration and dyes wool from a neutral to weakly acid bath a pure yellow tint. The dyeings produced therewith are distinguished by their remarkable properties of wet fastness and also by a good fastness to light.

is salted out, filtered off and dried. It dyes wool from a neutral to weakly acid bath a pure yellow tint of excellent fastness to washing, fulling and light.

*Example 4*

26.5 parts of 2-methoxy-1-aminobenzene-5-sulfonic acid N-β-chlorethylamide are diazotized as described in Example 2. The obtained diazo solution is coupled with an aqueous solution of 44 parts of 1-phenyl-3-methyl-5-pyrazolone-2'-chloro-5'-sulfonic acid N-benzene sulfonylamide, 5.3 parts of sodium carbonate and 20 parts of sodium acetate. By working up in the usual manner there is obtained the dyestuff of the formula

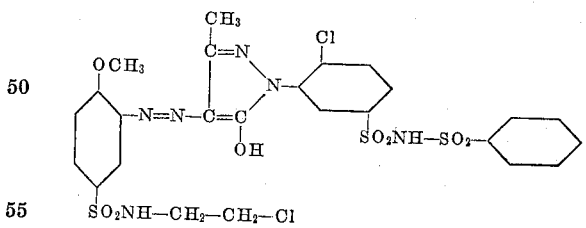

This dyestuff dyes wool from a neutral to weakly acid bath a gold yellow tint having remarkable properties of wet fastness and a very good fastness to light.

The 1-phenyl-3-methyl-5-pyrazolone-2'-chloro-5'-sulfonic acid N-benzene sulfonylamide used above can be obtained by the method described in the last paragraph of Example 1 by using 34.7 parts of 1-amino-2-chlorobenzene-5-sulfonic acid N-benzene sulfonylamide, instead of the quantity of 3-aminobenzene-1-sulfonic acid N-benzene sulfonylamide given in that example.

In the following table are given further dyestuffs obtained by the method described above. In column III are given the tints of the dyeings produced on wool by dyeing from a neutral or weakly acetic acid bath with the corresponding monoazo dyestuffs prepared from the diazo components and coupling components given in columns I and II.

| | I<br>Diazo-components | II<br>Coupling components | III |
|---|---|---|---|
| 1 | 4-(2-chloroethylsulfamoyl)aniline | acetoacetyl-4-(phenylsulfonylsulfamoyl)anilide | pure yellow. |
| 2 | 4-(2-chloroethylsulfamoyl)aniline | acetoacetyl-2-chloro-4-(phenylsulfonylsulfamoyl)anilide | green-yellow. |
| 3 | 4-(2-chloroethylsulfamoyl)aniline | acetoacetyl-2,6-dichloro-4-(phenylsulfonylsulfamoyl)anilide | Do. |
| 4 | 4-(2-chloroethylsulfamoyl)aniline | acetoacetyl-4-chloro-2-(phenylsulfonylsulfamoyl)anilide | pure yellow. |
| 5 | 4-(2-chloroethylsulfamoyl)-2-methylaniline | acetoacetyl-3-(ethylsulfonylsulfamoyl)anilide | Do. |
| 6 | 4-(2-chloroethylsulfamoyl)-2-methylaniline | acetoacetyl-4-(phenylsulfonylsulfamoyl)anilide | Do. |
| 7 | 4-(2-chloroethylsulfamoyl)-2-methylaniline | acetoacetyl-2-chloro-4-(phenylsulfonylsulfamoyl)anilide | greenish yellow. |
| 8 | 4-(2-chloroethylsulfamoyl)-2-methylaniline | acetoacetyl-2,6-dichloro-4-(phenylsulfonylsulfamoyl)anilide | Do. |
| 9 | 4-(2-chloroethylsulfamoyl)-2-methylaniline | acetoacetyl-3-(4-chlorophenylsulfonylsulfamoyl)anilide | pure yellow. |

| | I<br>Diazo-components | II<br>Coupling components | III |
|---|---|---|---|
| 10 | 4-methyl-1-aminobenzene-3-(N-β-chlorethyl)sulfonamide | 1-phenyl-3-methyl-5-pyrazolone-4'-(N-2,5-dichlorobenzenesulfonyl)sulfonamide | pure yellow. |
| 11 | 4-methyl-1-aminobenzene-3-(N-β-chlorethyl)sulfonamide | 1-phenyl-3-methyl-5-pyrazolone-4'-(N-2,5-dichlorobenzenesulfonyl)sulfonamide | Do. |
| 12 | 2-methoxy-1-aminobenzene-4-(N-β-chlorethyl)sulfonamide | 1-phenyl-3-methyl-5-pyrazolone-4'-(N-2,5-dichlorobenzenesulfonyl)sulfonamide | gold yellow. |
| 13 | 4-methyl-1-aminobenzene-3-(N-1-ethyl-2-chlorethyl)sulfonamide | 1-phenyl-3-methyl-5-pyrazolone-4'-(N-2,5-dichlorobenzenesulfonyl)sulfonamide | pure yellow. |
| 14 | 4-methyl-1-aminobenzene-3-sulfonyl-(4'-amino)phenyl-N-β-chlorethylsulfonamide | 1-phenyl-3-methyl-5-pyrazolone-4'-(N-2,5-dichlorobenzenesulfonyl)sulfonamide | Do. |
| 15 | 4-methyl-1-aminobenzene-3-(N-β-bromethyl)sulfonamide | 1-phenyl-3-methyl-5-pyrazolone-4'-(N-acetyl)sulfonamide | Do. |
| 16 | 2-methoxy-1-aminobenzene-4-(N-γ-bromopropyl)sulfonamide | 1-phenyl-3-methyl-5-pyrazolone-4'-(N-2,5-dichlorobenzenesulfonyl)sulfonamide | gold yellow. |

*Example 5*

24.9 parts of 4-methyl-1-aminobenzene-3-sulfonic acid N-β-chlorethylamide are diazotized as described in Example 1. The clear diazo solution is added to a solution of 38 parts of 1-hydroxynaphthalene-4-sulfonic acid N-benzene-sulfonylamide, 10.6 parts of sodium carbonate and 12 parts of sodium bicarbonate in 200 parts of water. When the coupling is finished the mixture is given a pH value of 6 by the addition of acetic acid, then heated to 80° C., mixed with 40 parts of sodium chloride, and the dyestuff is filtered off and dried. There is obtained the dyestuff of the formula

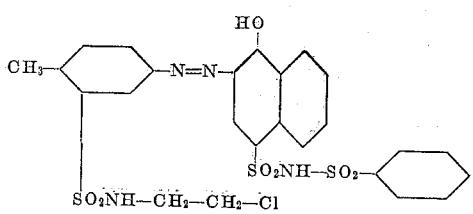

It is a red-brown powder which dissolves in water with a red coloration and dyes wool from a neutral to weakly acid bath a yellow-red tint of good fastness to washing and fulling.

*Example 6*

By using instead of the 1-hydroxynaphthalene-4-sulfonic acid N-benzene sulfonylamide mentioned in Example 5, 40 parts of 1:7-dihydroxynaphthalene-3-sulfonic acid N-benzene sulfonylamide there is obtained the dyestuff of the probable formula

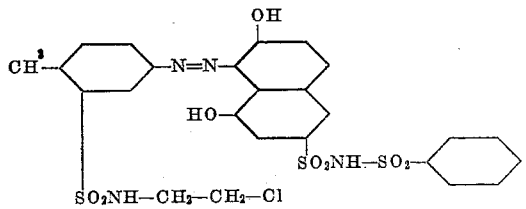

which dyes wool from a neutral to weakly acid bath a pure red tint of good fastness to washing and fulling.

*Example 7*

24.9 parts of 4-methyl-1-aminobenzene-3-sulfonic acid N-β-chlorethylamide are diazotized as described in Example 1, and added to a solution, adjusted with acetic acid to a pH value of 5–6, of 40 parts of 2-amino-8-hydroxynaphthalene-6-sulfonic acid N-benzene sulfonylamide (prepared from the 1:7-dihydroxynaphthalene-3-sulfonic acid N-benzenesulfonylamide mentioned in Example 6 by reaction with ammonia under pressure), 5.3 parts of sodium carbonate and 30 parts of crystalline sodium acetate in 200 parts of water. When the coupling is finished, the whole is heated to 60° C., then mixed with 50 parts of sodium chloride, filtered, and the filter residue is dried. There is obtained the dyestuff of the formula

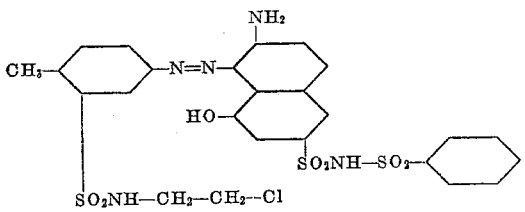

It is a red-brown powder which dissolves in water with a red coloration and dyes wool from a neutral to weakly acid bath a pure red tint of good fastness to washing, fulling and light.

*Example 8*

0.5 part of the dyestuff of Example 1 is dissolved in 4000 parts of water, 10 parts of crystalline sodium sulfate are added, and 100 parts of well wetted wool are entered at 40–50° C. into the resulting dyebath. There are then added 3 parts of acetic acid of 40 percent strength, the bath is raised to the boil in the course of ½ hour, and dyeing is carried on for ¾ hour at the boil. Finally the wool is rinsed with cold water and dried. There is obtained a level yellow dyeing of good fastness to light and remarkable fastness to washing.

A level yellow dyeing of good fastness to light and excellent fastness to washing is likewise obtained by the procedure described in this example, but without the addition of acetic acid to the dyebath.

What is claimed is:

1. A monohydroxy monoazo dyestuff free from sulfonic acid and carboxylic acid groups, which corresponds to the formula

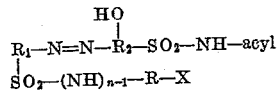

wherein $R_1$ represents a benzene radical, $R_2$—OH represents the radical of a coupling component bound to the azo linkage in a position vicinal to the hydroxyl group, $n$ represents a whole number up to 2, R represents a saturated aliphatic hydrocarbon radical with up to 4 carbon atoms, acyl represents a member selected from the group consisting of a lower alkane sulfonyl radical and a benzene sulfonyl radical, and X represents a member selected from the group consisting of a chlorine and a bromine atom.

2. A monohydroxy monoazo dyestuff free from sulfonic acid and carboxylic acid groups, which corresponds to the formula

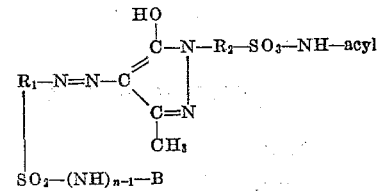

wherein $R_1$ and $R_2$ each represent a benzene radical, $n$ represents a whole number up to 2, B represents a lower β-chloro alkyl radical with up to 4 carbon atoms and acyl represents a member of the group consisting of lower alkane sulfonyl radical and a benzene sulfonyl radical.

3. A monohydroxy monoazo dyestuff free from sulfonic acid and carboxylic acid groups, which corresponds to the formula

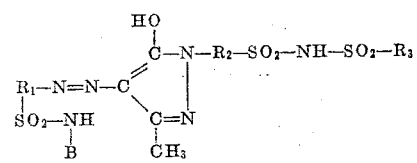

wherein $R_1$, $R_2$ and $R_3$ each represent a benzene radical and B represents a β-chloralkyl radical with up to 4 carbon atoms.

4. A monohydroxy monoazo dyestuff free from sulfonic acid and carboxylic acid groups, which corresponds to the formula

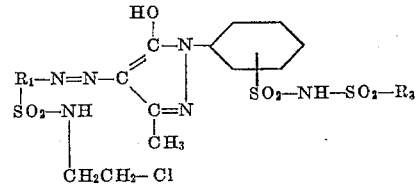

wherein $R_1$ and $R_3$ each represent a benzene radical.

5. A monohydroxy monoazo dyestuff free from sulfonic acid and carboxylic acid groups, which corresponds to the formula

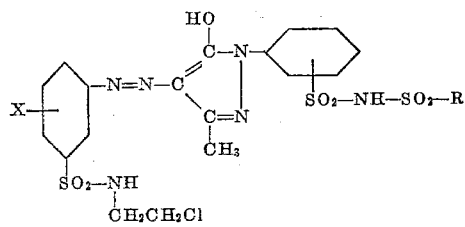

wherein R represents a chlorobenzene radical and X represents a member selected from the group consisting of a methyl and a methoxy group.

6. The monoazo dyestuff of the formula

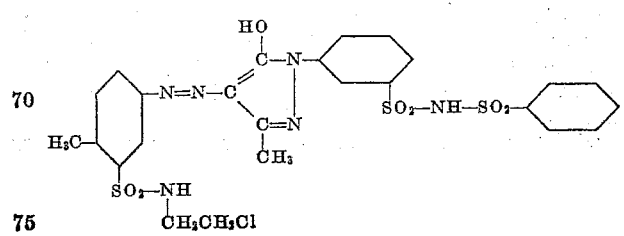

7. The monoazo dyestuff of the formula
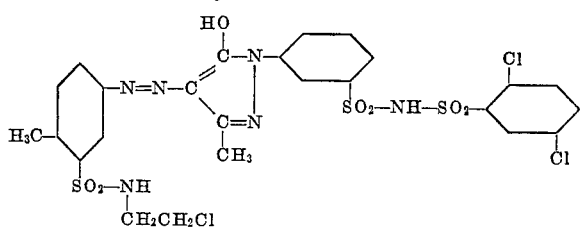
8. The monoazo dyestuff of the formula
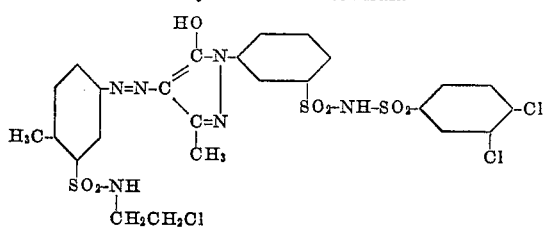
9. The monoazo dyestuff of the formula
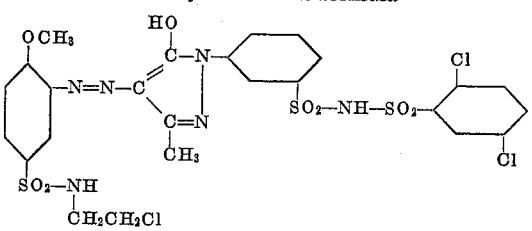
References Cited in the file of this patent
UNITED STATES PATENTS
| | | |
|---|---|---|
| 2,518,078 | Schmid et al. | Aug. 8, 1950 |
| 2,572,394 | Ruckstuhl et al. | Oct. 23, 1951 |
| 2,606,185 | Widmer et al. | Aug. 5, 1952 |